United States Patent [19]
Mouton

[11] Patent Number: 5,477,731
[45] Date of Patent: Dec. 26, 1995

[54] METHOD AND APPARATUS FOR DETECTING A FOULED FLUID FILTER

[75] Inventor: Pierre C. Mouton, Grigny, France

[73] Assignee: Societe Nationale d'Etude et de Construction de Moteurs d'Aviation (S.N.E.C.M.A.)., Paris, France

[21] Appl. No.: 248,091

[22] Filed: May 24, 1994

[30]  Foreign Application Priority Data

May 25, 1993 [FR] France ................... 93 06207

[51] Int. Cl.⁶ ........................................... G01N 15/08
[52] U.S. Cl. ................................... 73/38; 340/607
[58] Field of Search .................. 73/38; 340/607, 340/963; 210/741, 739, 85, 90, 103; 417/63

[56] References Cited

U.S. PATENT DOCUMENTS 3,033,030  5/1962  Heller ............................. 73/38
4,918,426  4/1990  Butts et al. ..................... 340/607

FOREIGN PATENT DOCUMENTS 2259637  8/1975  France .
4117422  11/1992  Germany .
1047159  11/1966  United Kingdom .
1081443  8/1967  United Kingdom .

Primary Examiner—Hezron E. Williams
Assistant Examiner—Michael J. Brock
Attorney, Agent, or Firm—Bacon & Thomas

[57]  ABSTRACT

A method and apparatus for detecting a fouled fluid filter are disclosed in which the fluid pressure at the outlet of the fluid filter is corrected by a correction pressure to determine a corrected pressure drop. Such a corrected pressure drop has a mathematical function which passes through a maximum magnitude before the fluid flowing through the fluid filter reaches a maximum value. The corrected pressure drop is monitored during the operation of the fluid filter and when the corrected pressure drop reaches a predetermined threshold value, before the engine with which the fluid filter is associated reaches its maximum power, an alarm will be actuated.

9 Claims, 4 Drawing Sheets

METHOD AND APPARATUS FOR DETECTING A FOULED FLUID FILTER

BACKGROUND OF THE INVENTION

The present invention relates to a method and apparatus for detecting a fouled fluid filter, in particular such a method and apparatus used for aircraft engine fuel or oil feed circuits.

Fluids moving through the fuel or oil feed circuits of aircraft engines must be entirely free of impurities. It is known to filter these fluids using a fuel or oil filter which must be replaced when fouled or clogged with impurities. It is further known to install a bypass valve in parallel with the fluid filter wherein the valve opens when the fluid pressure drop across the filter between the filter inlet and filter outlet reaches a predetermined magnitude. The pressure drop will increase as the fluid filter becomes clogged with impurities. The bypass valve enables fluid to pass around the fluid filter so that the fluid will retain the desired pressure and that the circulation of the fluids throughout the aircraft engine will be unimpaired.

However, once the aircraft engine operates with an open bypass valve, the fuel or oil feed circuits may become contaminated. In order to monitor the status of the fluid filter, the filter pressure drop is permanently monitored by a detector, which typically comprises a pressure switch connected to an instrument or alarm in the cockpit of the aircraft. The drawbacks of such known systems include the fact that impurity clogging of the fluid filter will most likely arise when the aircraft engine is operating at maximum power and when the fluid passing through the filter is relatively cold.

In regards to an aircraft engine, the highest power output coupled with the coldest fluid temperatures will simultaneously occur during takeoff. The filter clogging alerts in most case arise during takeoff and in a significant number of cases, results in the aircraft stopping on the runway because the crew must stop the aircraft as soon as the filter clogging alarm is actuated. Generally, these aborted takeoffs are stopped from high speeds and may cause the aircraft to overshoot the end of the runway. Also, such aborted takeoffs degrade the airline's operational reliability and increase maintenance costs on brakes and tires of the aircraft.

SUMMARY OF THE INVENTION

A method and apparatus for detecting a fouled fluid filter are disclosed in which the fluid pressure at the outlet of the fluid filter is compared to a correction pressure to determine a corrected pressure drop. Such a corrected pressure drop has a mathematical function which passes through a maximum magnitude before the fluid flowing through the fluid filter reaches a maximum value. The corrected pressure drop is monitored during the operation of the fluid filter and when the corrected pressure drop reaches a predetermined threshold value, before the engine with which the fluid filter is associated reaches its maximum power, an alarm will be actuated.

The object of the present invention is to avoid needlessly aborted aircraft takeoffs by detecting fluid filter fouling during a flight stage other than at takeoff at lesser engine speeds or lower power operating modes. For that purpose, the filter pressure drop is monitored after having been corrected by a correction pressure which is a function of the filter flow or of the engine mode of operation. The correction is carried out in such a manner that the pressure drop monitored by the filters fouling or clogging detector crosses a maximum magnitude before the fluid flow reaches its maximum period.

The correction can be carried out by using a venturi tube, a centrifugal pump associated with the aircraft engine, or using computer software, if the engine is fitted with a full authority digital electronic computer (FADEC).

According to the method of the present invention, the detecting of a fouled fluid filter consists of correcting the filter pressure drop by a pressure correction factor which is a function of the filter flow, the correction being carried out in such a manner that the flow-function of the corrected pressure drop passes through a maximum magnitude before the fluid flow reaches its highest point. The corrected pressure drop is monitored and, when it exceeds a predetermined threshold value, the method triggers an alarm. The apparatus according to the present invention has means for generating an intermediary pressure which is related to the magnitude of the fluid filter flow and has a mathematical function of a higher degree or power than the mathematical function of the filter pressure drop. The apparatus also includes devices for monitoring and correcting the filter pressure drop by means of the pressure generated as the intermediary pressure and a device for monitoring the filter to actuate an alarm.

DETAILED DESCRIPTION OF THE PREFERRED EMBODIMENT

Figure 1:
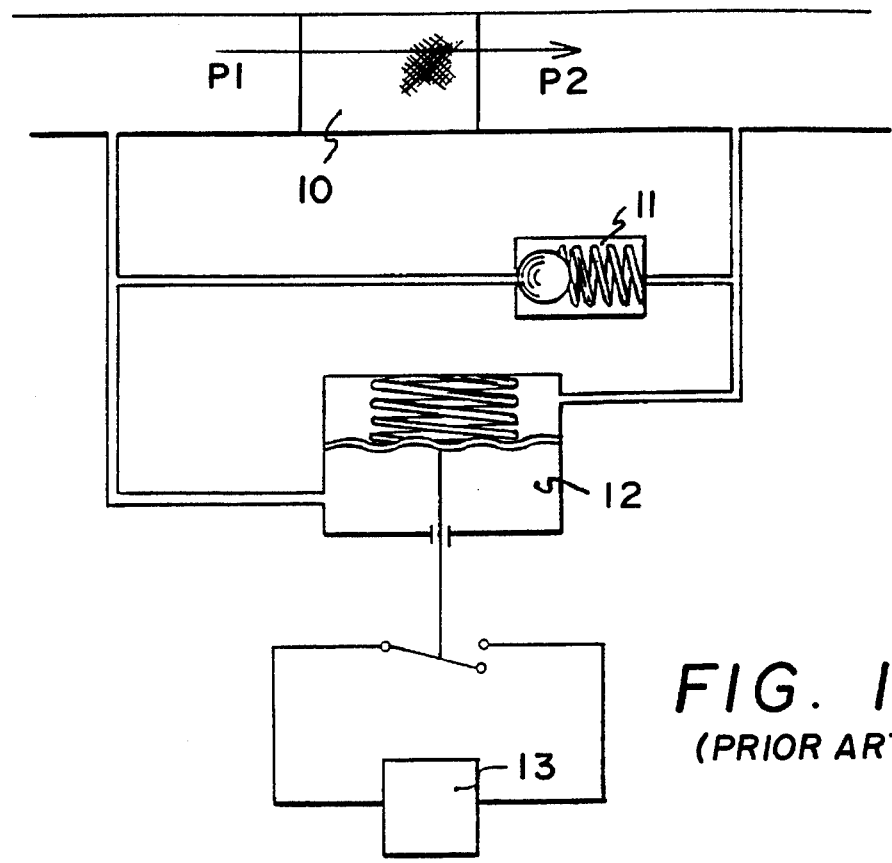
FIG. 1 is a schematic diagram of a typical prior art fouled fluid detecting system.

FIG. 1 is a schematic diagram of a fluid filter clogging detector according to the prior art in which filter 10 is an in-line filter located in the main flow conduit of a fluid feed circuit of a gas turbine engine. The clogging or fouling detector comprises a bypass valve 11 connected in parallel with the fluid filter 10 and which opens as soon as the pressure drop across the fluid filter (P1–P2) caused by the clogging or fouling of the filter reaches a predetermined value, thereby short circuiting the filter so that fluid may continue to circulate through the system. A pressure switch 12 of the known detector is also connected in parallel with both the filter and the bypass valve 11 and is connected to an alarm 13 so as to continuously monitor the pressure differential (P1–P2) across the inlet and outlet of the filter 10. The alarm is actuated when the pressure drop exceeds a predetermined threshold value. The filter clogging detection threshold is selected to be somewhat lower than the magnitude at which the bypass valve 11 opens.

Figure 2:
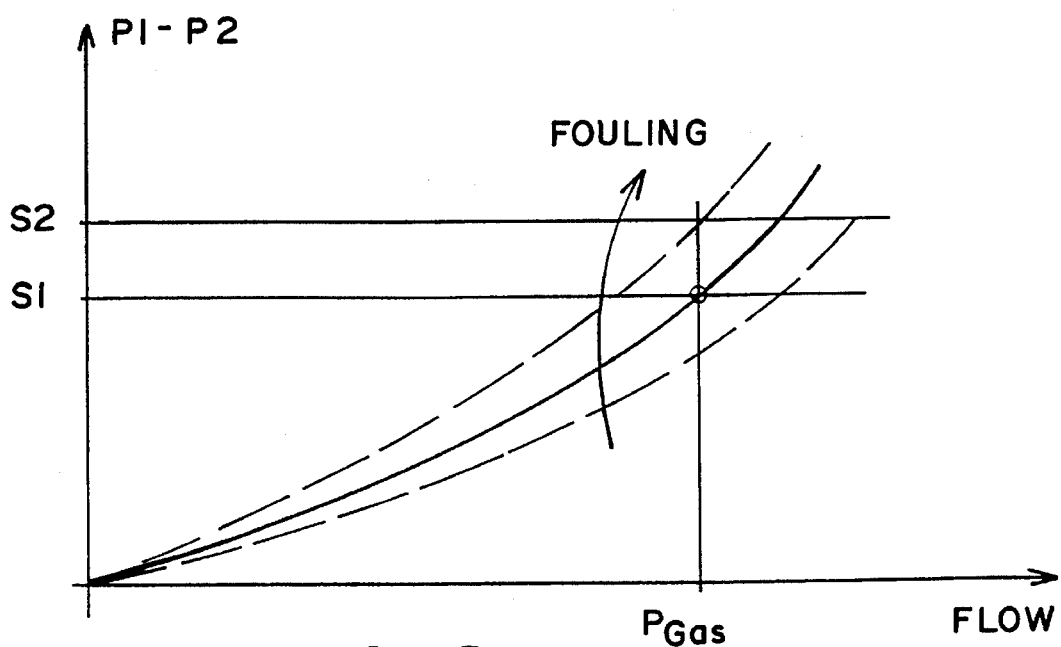
FIG. 2 is a graph illustrating the pressure drop versus fluid flow of the known system.

FIG. 2 shows characteristic curves of the pressure drop across the inlet and outlet of the fluid filter 10, each curve corresponding to a different level of fluid filter clogging or fouling. These curves illustrate that, for a particular level of clogging or fouling, the pressure drop across the filter is substantially a mathematical function of the second power or degree of the flow. Furthermore, the filter pressure drop increases as the level of fouling or clogging of the filter increases. The graph illustrates two different thresholds S1 and S2 which are selected. The filter clogging is detected at a threshold magnitude of S1 which may actuate the alarm 13 and which is lower than the threshold magnitude S2 at which the bypass valve 11 opens. The figure also illustrates a clogging detection point $P_{gas}$ at which the fluid flow is maximum at the engine full power operating mode.

Figure 3:
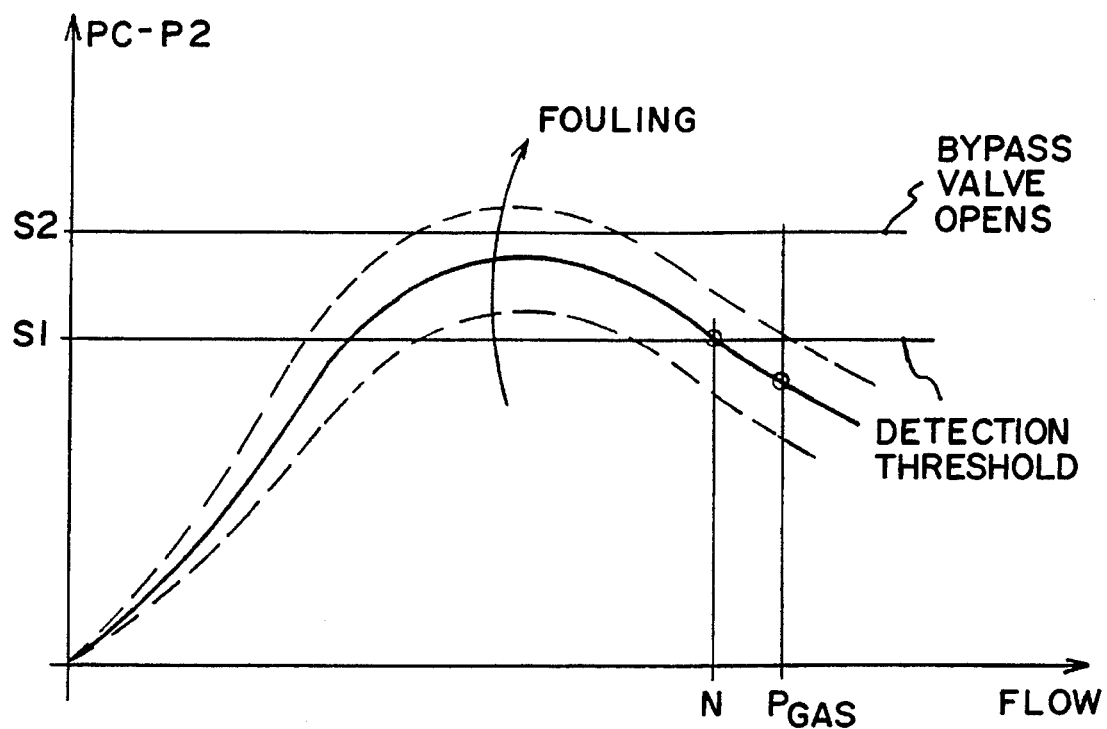
FIG. 3 is a graph of the correction pressure minus outlet pressure versus fluid flow illustrating characteristic curves of the monitored pressure drop function following correction by a pressure correction factor according to the present invention.

FIG. 3 illustrates characteristic curves of the pressure drop function corrected by a correction pressure factor (PC) according to the invention. The correction applied to the pressure drop is selected in such a manner than the measured PC–P2 pressure drop mathematical function is not a second order or power, but is a characteristic function with a maximum at an engine speed different from the full power engine speed $P_{gas}$.

The maximum value of the curves shown in FIG. 3 is obtained at an engine speed lower than at full power and before the fluid flow becomes a maximum. The threshold values S1 and S2, respectively, correspond to the detection threshold (S1) and to the bypass valve opening threshold (S2). This figures illustrates that it is possible to set the detection threshold S1 in such a manner that an alarm will be actuated at an engine speed N less than at full power. To achieve such a feature, the correction pressure factor must have a mathematical function of a higher degree than that of the pressure drop function of the fluid flow.

A relatively thick filtering material used in the fluid filter, such as felt, thick paper, glass wool, etc., will have a mathematical function of the filter pressure drop relative to the flow through the filter which is slightly less than a second degree function (the pressure drop function between turbulent flow and laminar flow). In this case, it suffices to use a correction pressure factor PC having a second degree mathematical function.

Figure 4:
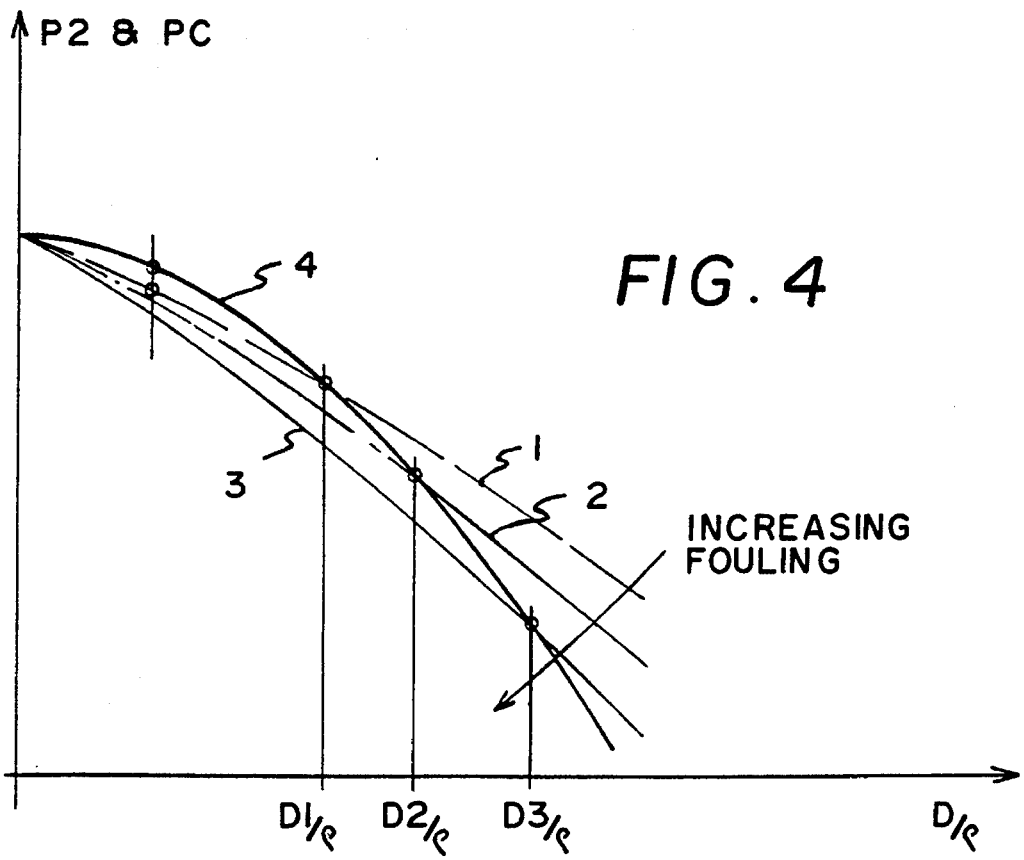
FIG. 4 is a graph of the correction pressure and outlet pressure versus the volumetric flow illustrating that the downstream pressure of the fluid filter when the engine operating mode is between laminar flow and turbulent flow and that the curve which is a function of the volumetric flow is a second degree curve.

FIG. 4 illustrates P2 pressure functions downstream of the filter when the aircraft engine speed is between laminar and turbulent flows and is further an illustrative function of a second degree of the volumetric flow. Curves 1, 2 and 3 denote increasing filter fouling or clogging which, during operation between laminar and turbulent flows has a mathematical function of slightly less than the second degree.

When the volumetric flow D/ρ increases to magnitudes D1/ρ, D2/ρ, or D3/ρ, respectively relating to curves 1, 2 and 3, the correction pressure PC, illustrated at curve 4 is higher than the pressure P2 corresponding to the curves 1, 2 and 3. Beyond the aforementioned magnitudes, the difference between PC and P2 pressures becomes negative, since correction pressure PC becomes less than pressure P2.

Figure 5:
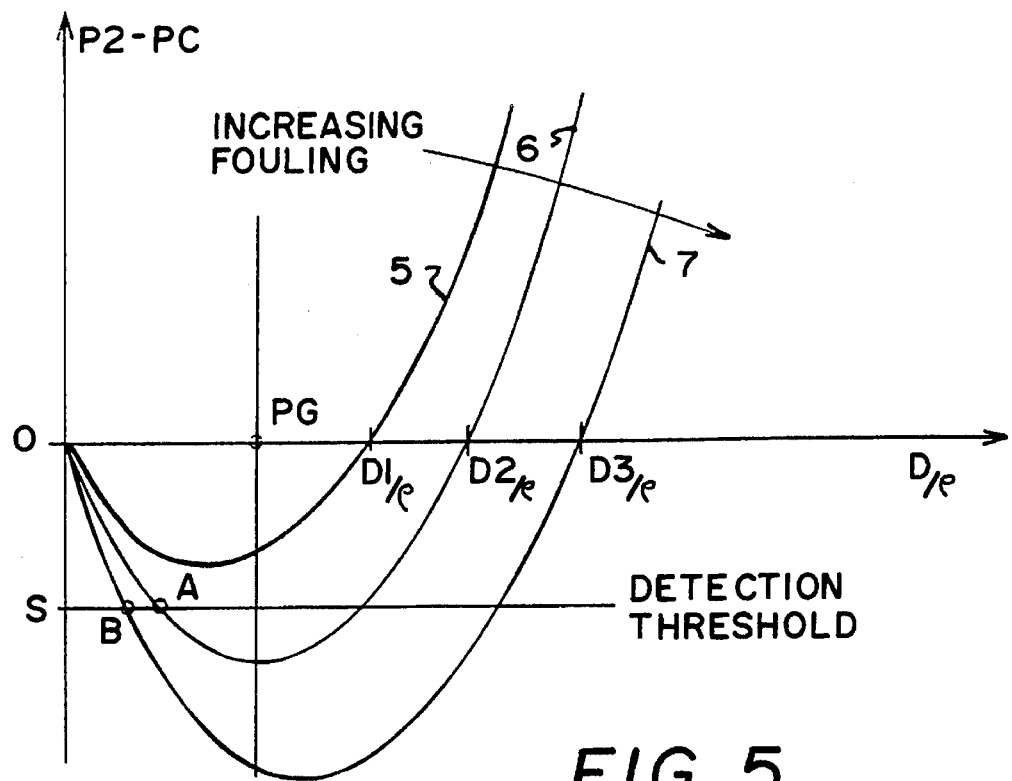
FIG. 5 is a graph of the corrected pressure drop versus volumetric flow of the system according to the present invention.

FIG. 5 illustrates the pressure difference between the pressure P2 of curves 1, 2 and 3 in FIG. 4 and the correction pressure PC of curve 4 in FIG. 4. Curves 5, 6 and 7 of FIG. 5 correspond to curves 1, 2 and 3 in FIG. 4. The difference P2–PC is at a maximum at increasing volumetric fluid flow when the filter fouling is increasing. The PC pressure function is selected in such a manner that the correction applied to the pressure P2, i.e. the curve P2–PC, will be at a maximum before the engine reaches its full power, this mode being associated with the volumetric flow and denoted by point PG in FIG. 5. A detection threshold S may then be selected in such a manner that the clogging or fouling alarm will be triggered before the full power point PG is reached. With the threshold level S illustrated in FIG. 5, triggering of the alarm takes place at A on curve 6 and at point B on curve 7, in each case, the corresponding engine mode of operation being well below the full power mode. Curve 5 shows a maximum value below the detection threshold. In this case, it illustrates a characteristic curve of a fluid filter which is insufficiently fouled or clogged to trigger the alarm.

Figure 6:
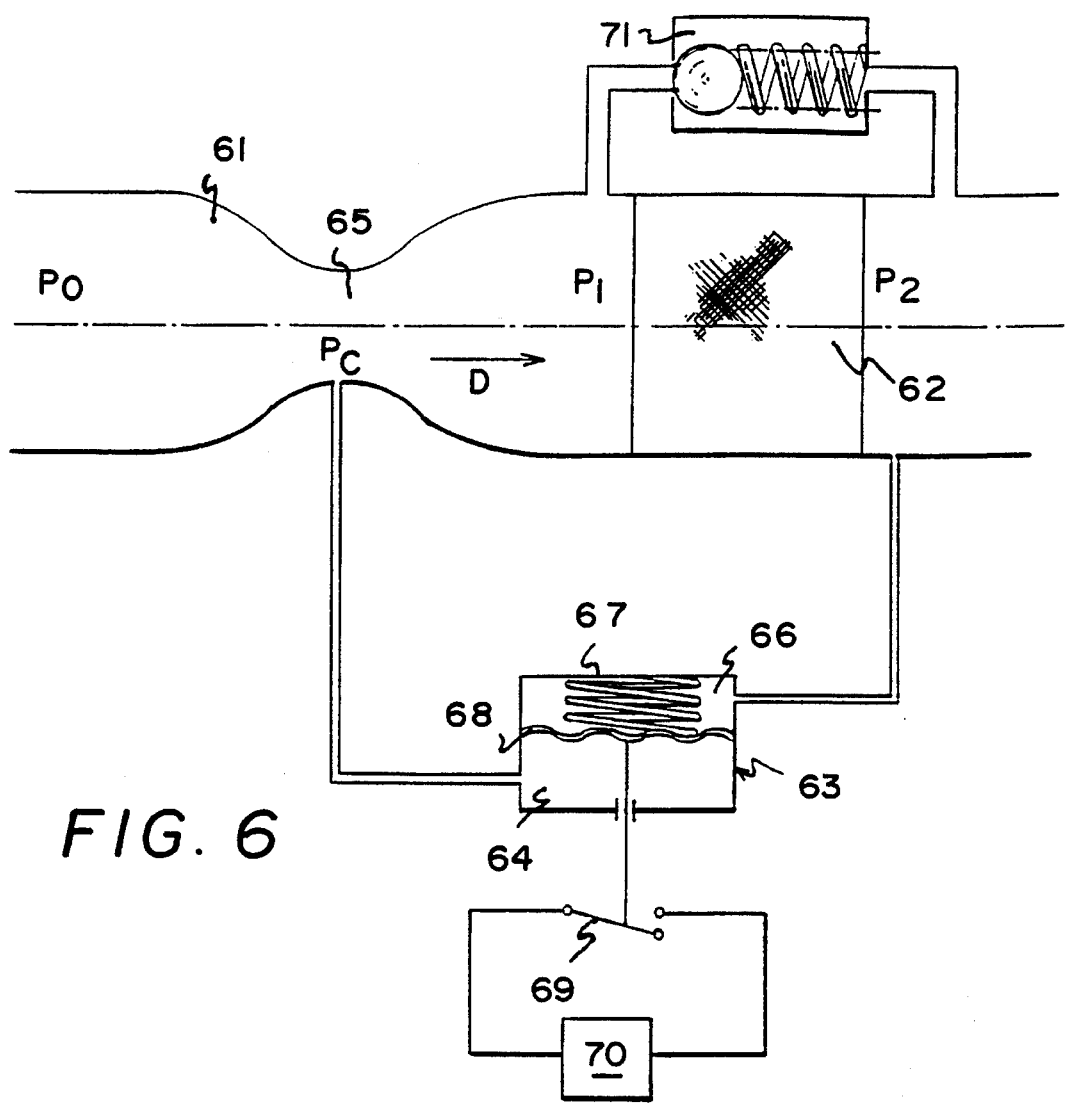
FIG. 6 is a schematic diagram of a first embodiment of the apparatus according to the present invention.

FIG. 6 illustrates a first embodiment of the apparatus for carrying out the method of the invention. In this embodiment a venturi tube 61 determines the correction pressure factor. As is well-known, at the throat of the venturi tube, the correction pressure PC decreases with the square of the fluid flow D according to the relationship:

$$D^2 = K(P0-PC)/\rho$$

wherein:

ρ=the fluid density;

P0=the pressure upstream of the venturi tube; and,

K1=a filter permeability coefficient depending on the degree of fouling.

The apparatus comprises a venturi tube 61 located in the main fluid flow conduit upstream of the fluid filter 62 and a bypass valve 71 connected to the main flow conduit in parallel with the fluid filter 62. The clogging or fouling detector 63 comprises a pressure switch having a first chamber 64 connected to the pressure PC at the throat 65 of the venturi 61, and a second chamber 66 which is exposed to the downstream pressure P2. Spring 67 is also located in second chamber 66 such that one end bears against a membrane 68 which is movable and which separates the first and second chambers 64 and 66. The pressures PC and P2 act on opposite sides of the membrane 68 which, when the PC exceeds P2 compresses the spring 67 and causes the membrane 68 to close a relay or movable switch element 69 once the detection threshold is reached. Closure of the relay or switch element 69 actuates an alarm 70 located in the aircraft when the filter is clogged or fouled.

Figure 7:
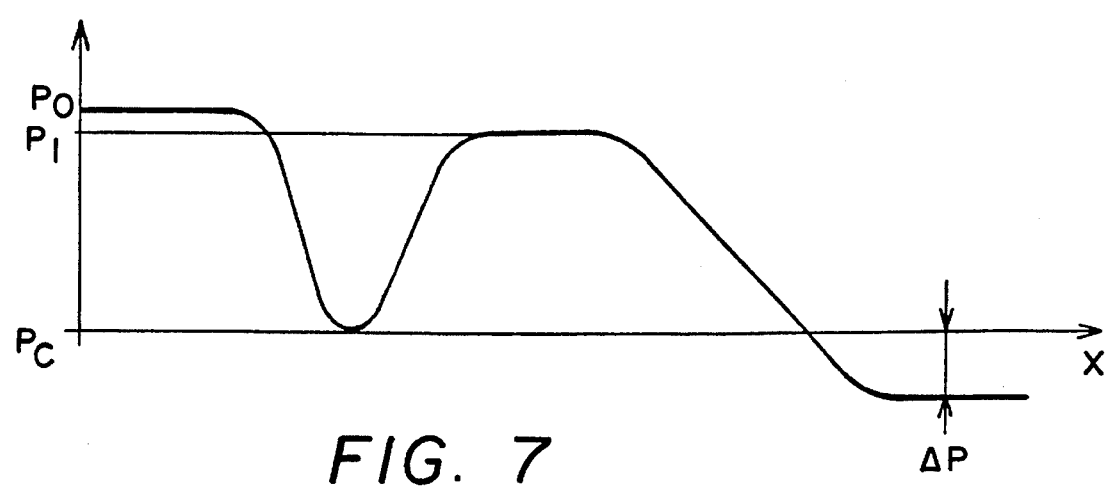
FIG. 7 is a graph of pressure versus distance along the main flow duct of the apparatus illustrated in FIG. 6.

FIG. 7 illustrates the pressure levels along the main fluid flow conduit having an axis X. Inside the venturi tube 61, the pressure decreases from a magnitude P0 to a minimum PC at the throat and then subsequently increases to a magnitude P1 in the diverging portion of the venturi tube. A pressure drop is incurred as the fluid flows through the filter from pressure P1 to pressure P2. The pressure differential monitored by the clogging is ΔP=P2–PC. When this monitored pressure differential ΔP exceeds the set threshold S, the filter is clogged or fouled and the alarm is actuated.

Figure 8:
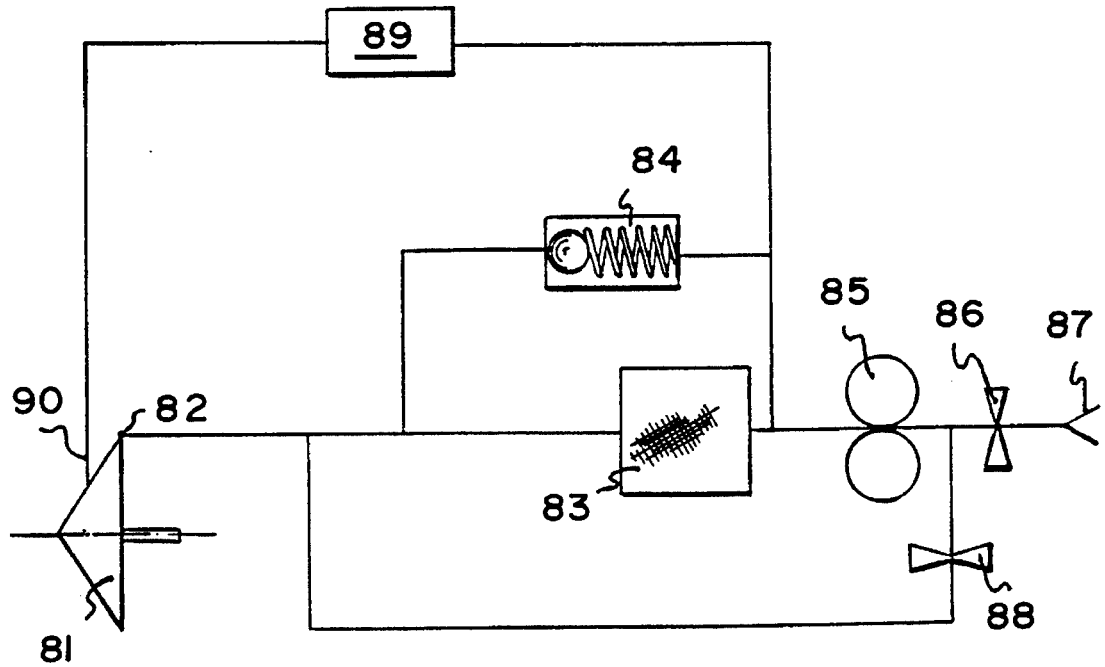
FIG. 8 is a schematic diagram of a second embodiment of the apparatus according to the present invention.

FIG. 8 illustrates a second embodiment of the apparatus for carrying out the method of the invention. In this embodiment, the correction pressure factor is determined by a centrifugal pump as a function of the pressure PC at the pump impeller. FIG. 8 represents a fuel feed circuit for a gas turbine engine having a centrifugal pump 81 with a low pressure outlet 82. The fluid exits from the centrifugal pump 81 and flows towards a fuel filter 83 which is also equipped with a bypass valve 84 located in parallel with the fuel filter. A positive displacement pump 85 having a high-pressure outlet is located downstream of the fluid filter 83 so as to supply the fuel to a fuel metering device 86 and fuel injectors 87. The apparatus also typically comprises a bypass valve 88 connected between the intake of the filter 83 and the outlet of the positive displacement pump 85 in order to return any unconsumed excess fuel to the fuel filter intake.

Filter clogging or fouling is sensed by a detector 89 which measures the pressure differential P2-PC between the downstream side of the filter (P2) and an intermediary pressure (PC) sensed at the impeller 90 of the centrifugal pump 81. The pressure PC increases with the square of the drive speed. The fuel flow through the filter varies directly with the engine drive speed, because the pressure pump 85 is of the positive displacement type.

The site for measuring the pressure PC at the centrifugal pump impeller should be selected in such a manner so as to allow a filter clogging or fouling detection threshold S such that the alarm will be actuated at an engine operation of less than full power. The higher the site of the measurement of the pressure PC along the pump impeller, the higher will be the magnitude of the pressure PC. This embodiment also allows monitoring the interruption in the drive transmitted to the centrifugal pump. In such an event, the pressure PC will drop abruptly and thereby trigger the clogging or fouling alarm.

In the event that the aircraft engine is equipped with a redundant, overriding digital electronic control system, such as full authority digital electronic computer known as FADEC, the correction pressure may be determined by the computer. The pressure drop is monitored by a pressure differential pickup measuring the pressure difference between the pressures upstream of the filter and downstream of the filter. This measured pressure drop is then transmitted to the computer which has means to generate an intermediary pressure and to correct the measured pressure drop. The measured pressure signal may be corrected, for instance, by subtracting a factor associated to the engine speed. The correction is such that the filter clogging or fouling is sensed at low or intermediate engine operating modes when the filter clogging reaches its critical threshold.

The foregoing description is provided for illustrative purposes only and should not be construed as in any way limiting this invention, the scope of which being defined solely by the appended claims.

I claim:

1. A method of detecting a fouled fluid filter having fluid flowing through the filter via a fluid inlet and a fluid outlet with a fluid pressure, P2, at the outlet, comprising the steps of:
   a) generating a correction pressure, PC, such that a corrected pressure drop. P2-PC, for a fouled fluid filter will reach a predetermined threshold value before the fluid flow rate through the filter reaches a maximum value;
   b) determining a corrected pressure drop P2-PC;
   c) repeating steps a) and b) during operation of the fluid filter and actuating an alarm if the determined corrected pressure drop reaches the predetermined threshold value.

2. The method of claim 1 wherein a mathematical function of the curve of the pressure correction factor PC versus fluid flow rate is of a higher degree or power than a mathematical function of a curve of the fluid pressure P2 versus fluid flow rate.

3. The method of claim 2 wherein the fluid flow rate through the fluid filter is between laminar flow and turbulent flow and wherein the mathematical function of the curve of the pressure correction factor versus fluid flow rate is a second degree function.

4. Apparatus for detecting fouling of a fluid filter having fluid flowing through the filter via a fluid inlet and a fluid outlet with a fluid pressure, P2, at the outlet, comprising:
   a) means for generating a correction pressure PC, such that a corrected pressure drop. P2-PC. for a fouled fluid filter will reach a predetermined threshold value before the fluid flow rate through the filter reaches a maximum value;
   b) means for determining a corrected pressure drop P2-PC; and,
   c) alarm means connected to the means for determining a corrected pressure drop P2-PC for actuating an alarm if the determined corrected pressure drop reaches the predetermined threshold value.

5. The apparatus of claim 4 further comprising:
   a) a pressure switch connected to the alarm means, and having first and second chambers and a movable membrane separating the chambers;
   b) first connecting means connecting the pressure switch to the means for generating a correction pressure correction PC such that pressure PC is applied to the first chamber; and,
   c) second connecting means connecting the pressure switch to the fluid pressure P2 such that pressure P2 is applied to the second chamber.

6. The apparatus of claim 5 wherein the alarm means is an electrically operated alarm and further comprising:
   a) a switch means to control actuation of the alarm, the switch means having a movable element to open and close the switch; and,
   b) means connecting the movable membrane to the movable element of the switch means.

7. The apparatus of claim 5 wherein the means for generating the correction pressure PC comprises a Venturi tube located in a fluid inlet conduit of the fluid upstream of the fluid filter wherein the first connecting means is connected to the throat of the Venturi tube.

8. The apparatus of claim 4 wherein the means for generating a correction pressure PC comprises a centrifugal pump having an impeller and an outlet wherein the correction pressure is tapped from the impeller upstream of the outlet.

9. The apparatus of claim 4 wherein the means for generating the correction pressure PC comprises a digital overriding electronic computer.

\* \* \* \* \*